(12) United States Patent
Heath, Jr. et al.

(10) Patent No.: US 8,514,913 B2
(45) Date of Patent: Aug. 20, 2013

(54) SYSTEM AND METHOD FOR TRANSMITTING PILOT AND DATA SYMBOLS IN A RELAYED-WIRELESS COMMUNICATIONS NETWORK

(75) Inventors: Robert W. Heath, Jr., Austin, TX (US); Ali Yazdan Panah, Austin, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 371 days.

(21) Appl. No.: 12/999,266

(22) PCT Filed: Jul. 16, 2010

(86) PCT No.: PCT/US2010/042332
§ 371 (c)(1),
(2), (4) Date: Dec. 15, 2010

(87) PCT Pub. No.: WO2012/008973
PCT Pub. Date: Jan. 19, 2012

(65) Prior Publication Data
US 2012/0014417 A1    Jan. 19, 2012

(51) Int. Cl.
H04L 25/60    (2006.01)
(52) U.S. Cl.
USPC .......................................................... 375/214
(58) Field of Classification Search
USPC .................................................. 375/211, 214
See application file for complete search history.

(56) References Cited

U.S. PATENT DOCUMENTS

| | | | | |
|---|---|---|---|---|
| 7,092,431 | B2 * | 8/2006 | Maeda et al. | 375/144 |
| 2008/0212659 | A1 * | 9/2008 | Usui | 375/219 |
| 2010/0223521 | A1 * | 9/2010 | Kim et al. | 714/748 |

OTHER PUBLICATIONS

, "International Search Report" dated Sep. 2, 2010 for Application No. PCT/US2010/042332.

Chen, Jiming et al., "Analysis and Optimization of Pilot-Symbol-Assisted-Modulation M-QAM for OFDM Systems", IEEE, 2003, pp. 2452-2456.
Liu, Mingliang et al., "A Channel Estimation Scheme for Amplify-and-Forward OFDM Relay Networks", IEEE, 2009, 5 pgs.
Cha, S. et al., "A new PAPR reduction technique for OFDM systems using advanced peak windowing method", Consumer Electronics, IEEE Transactions, May 2008, vol. 54, No. 2, pp. 405-410.
Chen, N. et al., "Peak-To-Average Power Ration Reduction in OFDM with Blind Selected Pilot Tone Modulation", Acoustics, Speech, and Signal Processing, IEEE International Conference, Mar. 18-23, 2005, vol. 3, pp. iii/845-iii/848.
Gedik, B. et al., "Two Channel Estimation methods for amplify-and-forward relay networks", Electrical and Computer Engineering, 2008, Canadian Conference, May 4-7, 2008, pp. 000615-000618.
Han, S. H. et al., "An Overview of Peak-To-Average Power Ratio Reduction Techniques for Multicarrier Transmission", Wireless Communications, IEEE, Apr. 2005, vol. 12, No. 2, pp. 56-65.
Patel, C. S. et al., "Channel Estimation for Amplify and Forward Relay Based Cooperation Diversity Systems", Wireless Communications, IEEE Transactions, Jun. 2007, Vo. 6, No. 6, pp. 2348-2356.

* cited by examiner

Primary Examiner — Don N Vo
(74) Attorney, Agent, or Firm — Dorsey & Whitney LLP

(57) ABSTRACT

Techniques are generally described for estimating a communication channel using wirelessly transmitted and retransmitted signals, each transmitted at a different power ratio. An example wireless communications system may include a base station, a relay station and a wireless device. The base station may include a transmitter configured to transmit a first signal, wherein the first signal includes pilot and data symbols with a first power ratio. The relay station may include a receiver configured to receive the first signal, and a transmitter configured to retransmit the first signal as a second signal, wherein the second signal includes pilot and data symbols with a second power ratio. The wireless device includes a receiver configured to receive the first and second signals, i.e. the transmitted and retransmitted pilot and data symbols having the first and second power ratios are received, and estimate a communications channel from the received signals.

12 Claims, 9 Drawing Sheets

SYSTEM AND METHOD FOR TRANSMITTING PILOT AND DATA SYMBOLS IN A RELAYED-WIRELESS COMMUNICATIONS NETWORK

BACKGROUND

Unless otherwise indicated herein, the materials described in this section are not prior art to the claims in this application and are not admitted to be prior art by inclusion in this section.

Wireless communications networks employ relay stations to increase the coverage and reliability of the wireless networks. The relay stations receive transmissions from a base station and retransmit the transmission to receivers, such as a wireless user. In establishing communications with the base station and relay station, the receiver establishes a communications channel with each station over which information is transmitted between the entities. As part of the process of establishing communications channels, the receiver "estimates" the communications channels to determine various parameters related to accurately extracting information from the received transmissions.

Channel estimation may be based at least in part on information provided to it by the respective transmitter, such as base station and relay station. For example, known pilot symbols may be included in the transmission of data symbols from the base station and relay station to the receiver, which uses the pilot symbols to estimate the communications channels. Typically, in a simple communications system having a base station, relay station, and receiver, there are three communications channels: a first communications channel between the base station and the receiver; a second communications channel between the base station and the relay station; and a third communications channel between the relay station and the receiver. The receiver performs channel estimation for communications channels with the base station and the relay station.

SUMMARY

Techniques are generally described that include methods, devices, and/or systems.

The present disclosure describes a method for a wireless device. Some example methods may include receiving a first transmission signal that includes data symbols and pilot symbols encoded therein. The data and pilot symbols are extracted from the transmission signal and available transmit power is allocated between the pilot symbols and the data symbols based at least in part on channel state information. The pilot symbols and data symbols are encoded into a second transmission signal using the allocated available transmit power and the second transmission signal is transmitted as a relay transmission.

The present disclosure also describes a method of wirelessly transmitting data. Some example methods may include transmitting pilot symbols and data symbols from a first transmitter, the transmitted pilot symbols and data symbols having a first power ratio. The pilot symbols and data symbols are received from the first transmitter and retransmitted from a second transmitter, the retransmitted pilot symbols and data symbols having a second power ratio. The transmitted and retransmitted pilot symbols and data symbols have the first and second power ratios, respectively, and at least the pilot symbols are used for estimating a communications channel.

The present disclosure also describes another method for a wireless device. Some example methods include receiving a first transmission signal from a first transmitter, the first transmission signal being encoded with pilot symbols and data symbols having a first power ratio. A second transmission signal is received from a second transmitter. The second transmission signal is encoded with pilot and data symbols having a second power ratio and the second transmission signal corresponds to a retransmission of the first transmission signal. A communications channel is estimated from the pilot symbols of the first transmission signal and the second transmission signal.

The present disclosure also describes a wireless communications network. Some example wireless communications networks include a first transmitter and a second transmitter. The first transmitter is configured to transmit a first transmission signal to a receiver. The first transmission signal is encoded with pilot and data symbols having a first power ratio. The second transmitter is configured to transmit a second transmission signal to the receiver. The second transmission signal is encoded with pilot and data symbols having a second power ratio that is different than the first power ratio.

The present disclosure also describes a wireless communications device. Some example wireless communications devices include a receiver and a transmitter. The receiver is configured to receive transmission signals from a plurality of transmitters. Each of the transmission signals is encoded with pilot and data symbols having a corresponding transmit power ratio. The receiver is further configured to estimate a communications channel from the pilot symbols of the received transmission signals. The transmitter is configured to transmit channel state information to at least one of the plurality of transmitters, wherein the channel state information is associated with the estimated communications channel.

The present disclosure also describes a relay transmitter. Some example relay transmitters include a receiver configured to receive a transmission signal including data symbols and pilot symbols encoded therein. A symbol extraction block also included in the relay transmitter is coupled to the receiver and configured to extract data and pilot symbols from the transmission signal. The relay transmitter further includes a power division controller configured to receive channel state information and calculate a respective power at which to transmit the pilot and data symbols based at least in part on the channel state information. A power division block coupled to the power division controller and the extraction block is configured to divide available transmit power between the pilot symbols and the data symbols according to the respective power ratio and provide power divided data and pilot symbols. A transmission symbol generation block is coupled to the power division block and configured to generate transmission symbols from the power divided data and pilot symbols, and a transmitter is coupled to the transmission symbol generation block and configured to wirelessly transmit the transmission symbols.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

In the drawings.

DETAILED DESCRIPTION

Figure 1:
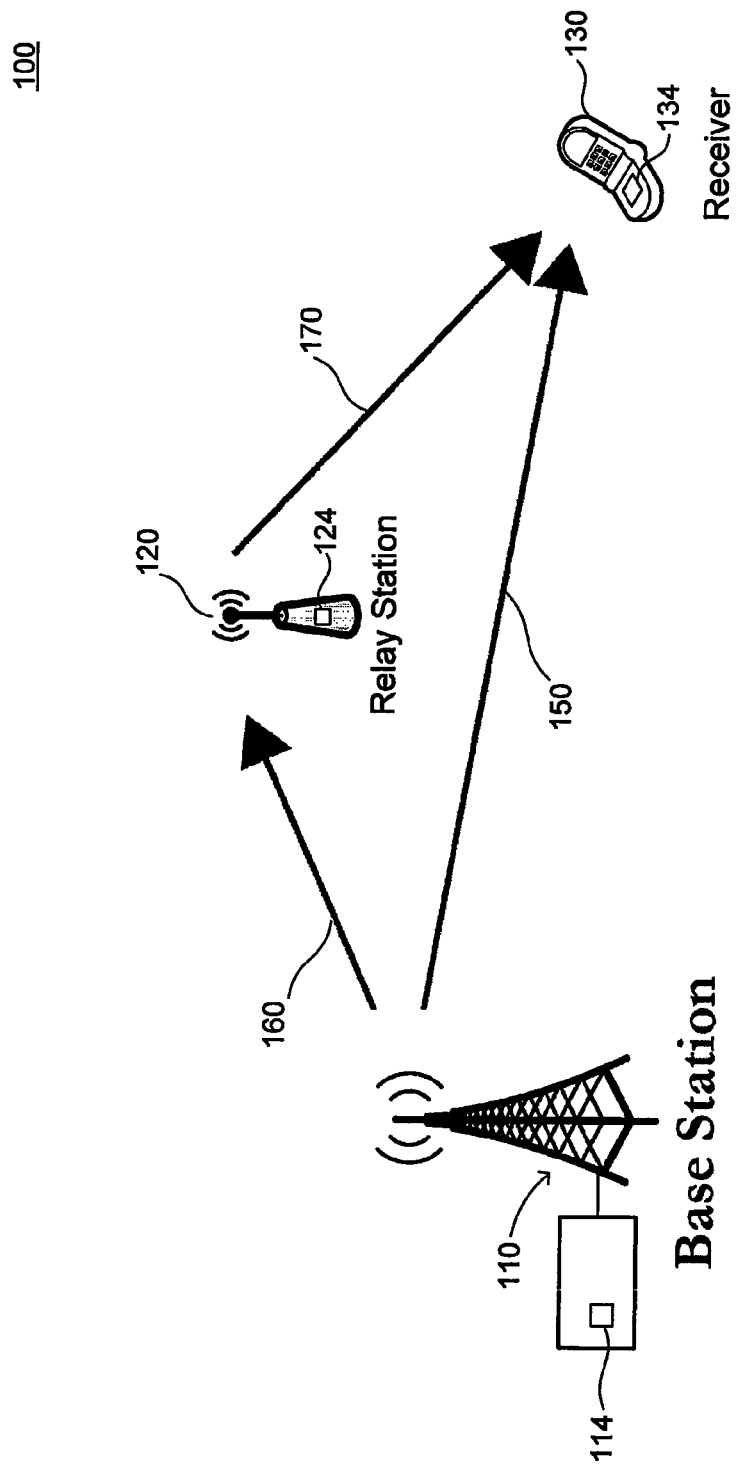
FIG. 1 is a diagram of a wireless communications network.

The following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, devices, and/or apparatus generally related to wireless communication and wireless communications systems. Techniques are generally described for estimating a communication channel using wirelessly transmitted and retransmitted signals, each transmitted at a different power ratio. An example wireless communications system may include a base station, a relay station and a wireless device. The base station may include a transmitter that is configured to transmit a first signal, wherein the first signal includes pilot and data symbols with a first power ratio. The relay station may include a receiver that is configured to receive the first signal, and a transmitter configured to retransmit the first signal as a second signal, wherein the second signal includes pilot and data symbols with a second power ratio. The wireless device includes a receiver that is configured to receive the first and second signals, i.e. the transmitted and retransmitted pilot and data symbols having the first and second power ratios are received, and estimate a communications channel from the received signals.

FIG. 1 is a diagram of an example wireless communications system 100 configured in accordance with at least some examples described herein. In some embodiments, the wireless communications system 100 may be a cellular communications system. In some embodiments, the wireless communications system 100 may be a wireless local area network. The wireless communications system 100 may represent other wireless communications systems, now known or later developed, as well. A base station 110 is configured in wireless communication with a relay station 120 and a receiver 130. For example, signals may be transmitted by the base station 110 and received by the relay station 120 and the receiver 130. The relay station 120 may be configured to receive and retransmit the signals transmitted by the base station 110 to extend the range over which information may be accurately received by the receiver 130. For example, the relay station 120 may be configured to receive signal transmissions from the base station 110 and amplify the same signals for retransmission. The base station 110 and the relay station 120 include a transmitter 114 and a transmitter 124, respectively, in accordance with at least some examples described herein. The receiver 130 includes a receiver block 134 in accordance with at least some examples described herein. A combination of pilot symbols and data symbols are encoded in the signals. Pilot symbols correspond to symbols known by a transmitter (e.g., base station 110, relay station 120) and a receiver (e.g., receiver 130) that may be used, as explained in more detail below, for establishing communications between the transmitter and receiver. Data symbols correspond to symbols transmitted to a receiver that represent information.

The receiver 130 is configured to establish a communications channel with each communication device (e.g., base station 110, and relay station 120) over which information is transmitted between the devices. As part of the process of establishing communications channels, the receiver block 134 of the receiver 130 estimates a communications channels with each device 110, 120 through the use of receiver block 134. The channel estimation is based at least in part on the pilot symbols provided with data symbols transmitted by the transmitter 114 of the base station 110 and the transmitter 124 of the relay station 120. As illustrated in FIG. 1, there are three communications channels: a first communications channel 150 between the base station 110 and the receiver 130, a second communications channel 160 between the base station 110 and the relay station 120, and a third communications channel 170 between the relay station 120 and the receiver 130. The receiver 130 is configured to perform channel estimation for communications channels 150 and 170.

One of the communications channels 150, 170 typically has a stronger signal than the other. For example, the communications channel 170 may have a stronger signal (e.g., a higher signal strength, higher transmit power, or higher signal to noise ratio, etc.) than the communications channel 150 because of the proximity of the receiver 130 to the relay station 120. The relative signal strengths of the communications channels 150, 170 may also vary, such as when the receiver 130 relocates relative to the base station 110 and the relay station 120, or when the environment between the base station 110, relay station 120, and the receiver 130 changes.

In the example wireless communications network 100, the signals (i.e., pilot symbols and data symbols) transmitted by the transmitter 114 of the base station 110 and transmitter 124 of the relay station 120 may be transmitted at different power levels. Generally, a greater portion of available transmit power will be allocated to the pilot symbols for the weaker communications channel (e.g., for communications channel 150 in the previous example). A greater portion of available transmit power may also be allocated to the data symbols in the stronger communications channel (e.g., for communications channel 170 in the previous example). As a result, the power ratio of pilot symbols to data symbols for the base station 110 and/or the relay station 120 may not be unity. Additionally, the power ratio applied in the base station 110 and the power ratio applied in the relay station 120 may be unequal with respect to one another. The power ratios applied by the base station 110 and the relay station 120 may also be dynamically changed by the base station 110 and/or the relay station 120 as the strengths of the communications channels 150 and 170 change over time. The division of available transmit power between the pilot symbols and data symbols may be allocated (i.e., allocated by the base station 110 and/or the relay station 120) based at least in part on channel state information provided by the receiver 130. In some embodiments, in addition or in alternative to channel state information, the division of available transmit power may be based at least in part of other parameters, for example, receiver location, relay station capability, network loading, and others as well.

Transmitting the pilot and data symbols at different power levels using the transmitters 114 and 124 from the base station 110 and the relay station 120, respectively, may result in improved quality of communications with the receiver 130. For example, assuming that the communications channel 150 with the receiver 130 is weaker than the communications channel 170, transmitting the pilot symbols over the communications channel 150 with more relative power than the data symbols may improve channel estimation accuracy for communications channel 150. For communications channel 170, transmitting the data symbols with more relative power than the pilot symbols may improve data symbol detection accuracy or improve resilience to noise for transmissions over communications channel 170.

Figure 2:
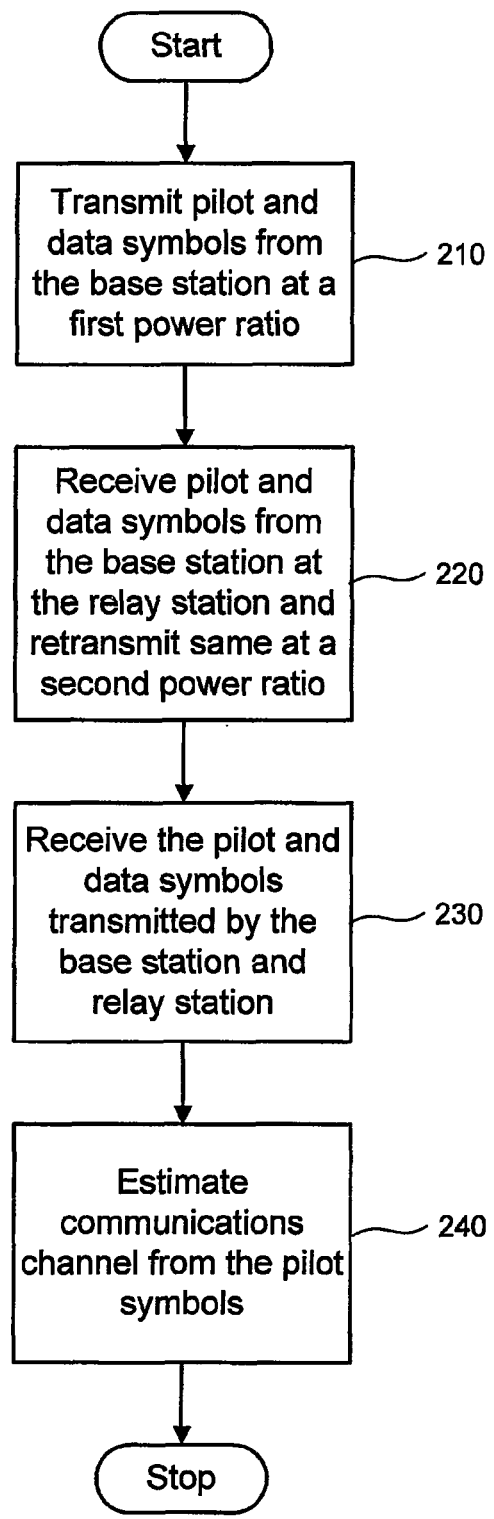
FIG. 2 is a flow diagram illustrating some example methods for wirelessly communicating data; all arranged in accordance with at least some examples of the present disclosure.

FIG. 2 is a flow diagram illustrating some example methods 200 for wirelessly communicating data in accordance with at least some embodiments described herein. The example methods of FIG. 2 may be used with the example communications system 100 of FIG. 1. An example method may include one or more operations, actions, or functions as illustrated by one or more of blocks 210, 220, 230 and/or 240. Although illustrated as discrete blocks, various blocks may be divided into additional blocks, combined into fewer blocks, or eliminated, depending on the desired implementation. Processing may begin at block 210.

In block 210, pilot and data symbols are transmitted from a base station at a first power ratio. The pilot symbols may be transmitted by the base station at a first power level, while the data symbols may be transmitted by the base station at a second power level. For this example, the first power ratio corresponds to the ratio of the first power level to the second power level. In some examples, a transmitter in the base station may be configured to adjust the transmit power levels associated with the pilot and data symbols in response to information provided to it from the receiver, for example, channel state information. Block 210 may be followed by block 220.

In block 220, the pilot and data symbols from the base station may be received by a relay station and subsequently retransmitted by the relay station 220 at a second power ratio. The pilot symbols may be retransmitted by the relay station at a third power level, while the data symbols may be retransmitted by the base station at a fourth power level. For this example, the second power ratio corresponds to the ratio of the third power level to the fourth power level. Block 220 may be followed by block 230.

In block 230, the pilot and data symbols transmitted by the base station and retransmitted by the relay station are received by a receiver. Block 230 may be followed by block 240.

In block 240, the receiver may be configured to estimate a communication channel from the transmitted symbols, for example, the pilot symbols. In one non-limiting example, a communications channel is estimated by the receiver based at least in part from the accuracy of the received pilot symbols as compared with the known pilot symbols. The channel estimation analysis may be implemented using techniques now known or later developed. Processing for method 200 may be terminated after block 240.

Figure 3:
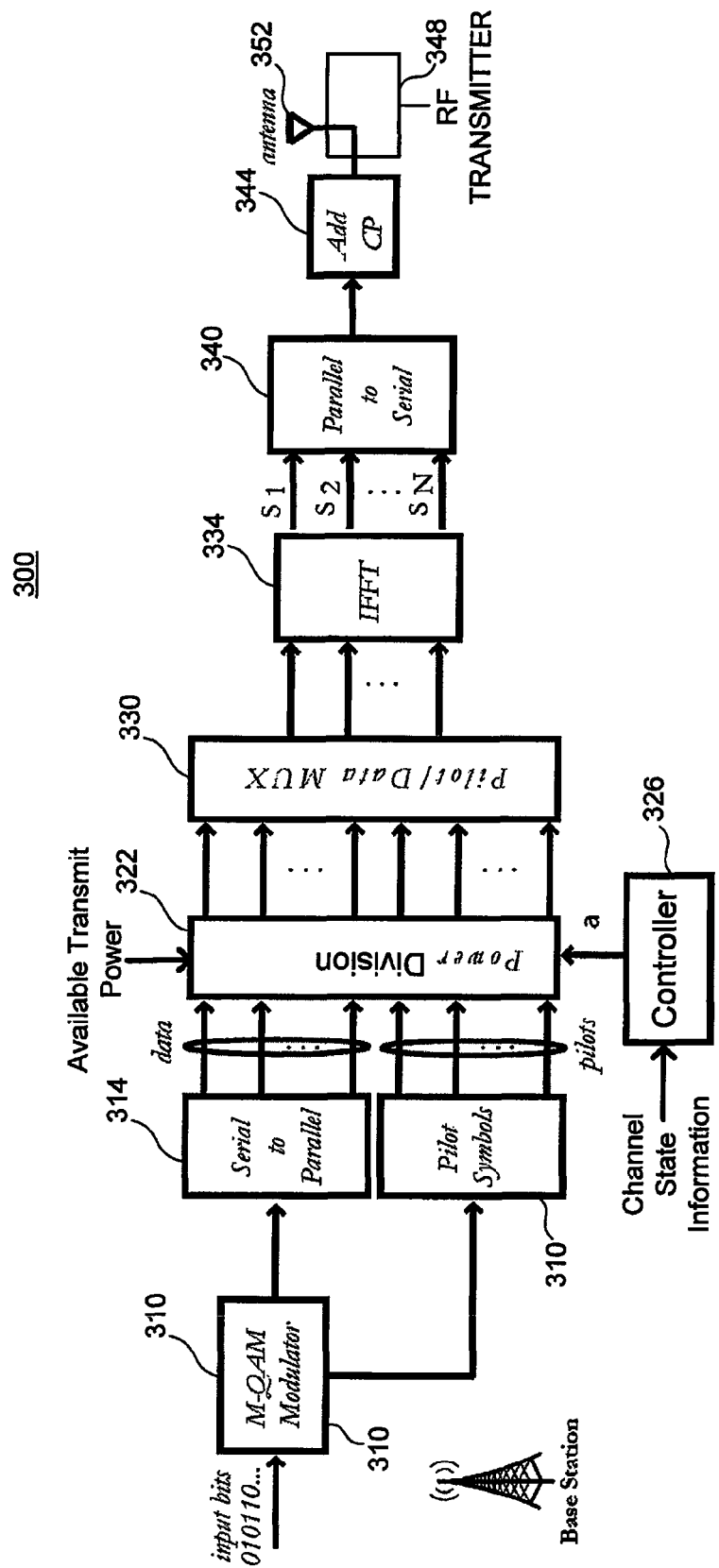
FIG. 3 is a block diagram for a portion of an example transmitter, such as a base station.

FIG. 3 is a block diagram for a portion of an example transmitter 300, such as a base station configured in accordance with at least some embodiments described herein. The transmitter 300 is configured to receive data and encode the received data so that it may be wirelessly transmitted. FIG. 3 illustrates a multi-quadrature amplitude (M-QAM) modulator 310 that is configured to receive a stream of input binary digits ("bits"). The stream of input bits may represent data to be transmitted to a receiver. The input bits are modulated by the M-QAM modulator 310, which is arranged to provide the modulated bits to a serial-to-parallel converter 314. The serial-to-parallel converter 314 is arranged to receive the serial stream of modulated bits and configured to provide the modulated bits in parallel as data symbols to a power division block 322. A pilot symbol generator 318 is arranged to generate pilot symbols based on information from the M-QAM modulator 310, where the pilot symbols are provided to the power division block 322. The pilot symbols are transmitted with the data symbols, and as previously discussed, are used by a receiver to estimate a communications channel on which data and pilot symbols are transmitted.

A power division controller 326 is configured to control the power division block 322 to allocate available transmit power between the pilot symbols and the data symbols for transmission according to a power ratio "a." The transmit power level for the pilot symbols can thus be adjusted along with the transmit power level for the data symbols to achieve the desired power ratio "a." As will be described below, the power division controller 326 may control the power division block 322 to allocate the available transmit power based on various factors, for example, channel-state information, signal-to-noise ratio (SNR), symbol error rate (SER), or other factors related to channel performance. The power adjusted pilot and data symbols are provided to a multiplexer 330, which is arranged to multiplex the pilot and data symbols and assemble the pilot symbols with the data symbols for transmission. The assembled pilot and data symbols are provided to an inverse discrete Fourier transform (IFFT) block 334. The IFFT block 334 is configured to generate transformed symbols (i.e., S1, S2, . . . SN). The transformed symbols are provided to a parallel-to-serial converter 340 and then to a CP block 344, or cyclical prefix block, which is configured to provide a transmission symbol. The transmission symbols include a cyclical prefix appended to the beginning of the transmission symbol by the CP block 344 to reduce intersymbol interference. The transmission symbols are provided to a radio-frequency (RF) transmitter 348 configured to modulate and amplify the transmission symbols to be transmitted from the transmitter 300 through the antenna 352. In some embodiments, the symbols may be transmitted according to orthogonal frequency-division multiplexing (OFDM).

Figure 4:
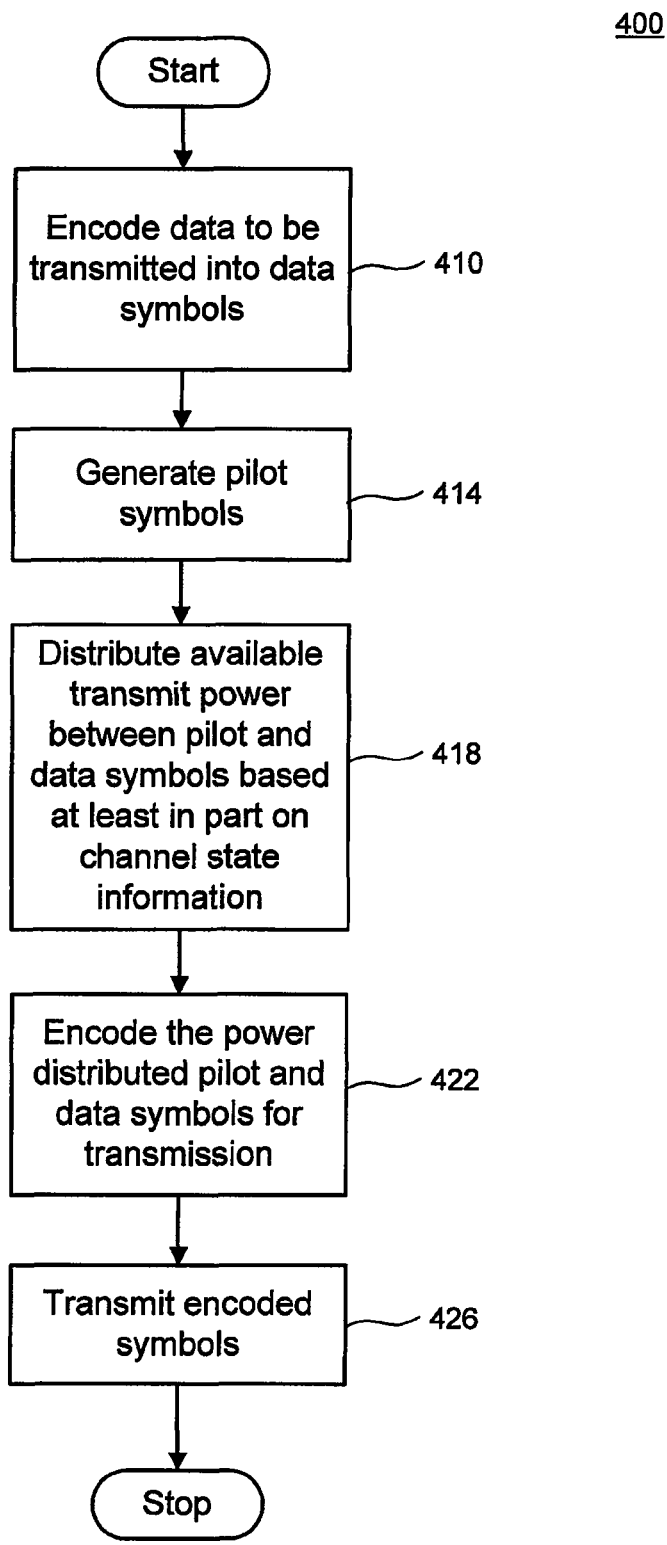
FIG. 4 is a flow diagram illustrating some example methods for transmitting data; all arranged in accordance with at least some examples of the present disclosure.

FIG. 4 is a flow diagram illustrating some example methods for transmitting data in accordance with at least some embodiments described herein. The example methods of FIG. 4 may be implemented by the transmitter 300 of FIG. 3. An example method 400 may include one or more operations, actions, or functions as illustrated by one or more of blocks 410, 414, 418, 422 and/or 426. Although illustrated as discrete blocks, various blocks may be divided into additional blocks, combined into fewer blocks, or eliminated, depending on the desired implementation. Processing may begin at block 410.

In block 410 data to be transmitted is encoded into data symbols. For example, data that is to be transmitted may be encoded by the M-QAM modulator 310 (FIG. 3) and serial-to-parallel converter 314. That is, a bit stream of data are modulated and used by the serial-to-parallel converter 314 to provide data symbols. In some examples the data may be encoded using other techniques other than M-QAM modulation. Block 410 may be followed by block 414.

Pilot symbols are generated in block 414 that can be transmitted along with the data symbols. For example, pilot symbols may be generated by the pilot symbol generator 318 in response to information provided to it by the M-QAM modulator 310. Block 414 may be followed by block 418.

Available transmit power, the total of which may be constrained in practical systems, is divided (e.g., apportioned or allocated) between the pilot symbols and data symbols based at least in part on channel state information in block 418. For example, power can be divided by the power division block 322 in response to the power division controller 326 controlling it to allocate available transmit power between the pilot symbols and the data symbols. The division of the available transmit power between the pilot and data symbols may be determined, as will be described in more detail below, using information provided to the controller from a receiver, such as channel state information. Block 418 may be followed by block 422.

In block 422 the power divided pilot symbols and data symbols are assembled and transformed by multiplexer 330 and IFFT 334 for transmission in response to receiving the power divided pilot and data symbols from the power division block 322. Block 422 may be followed by block 426.

The encoded power divided pilot and data symbols are transmitted by the . . . in block 426. Processing for method 400 may terminate after block 426.

Figure 5:
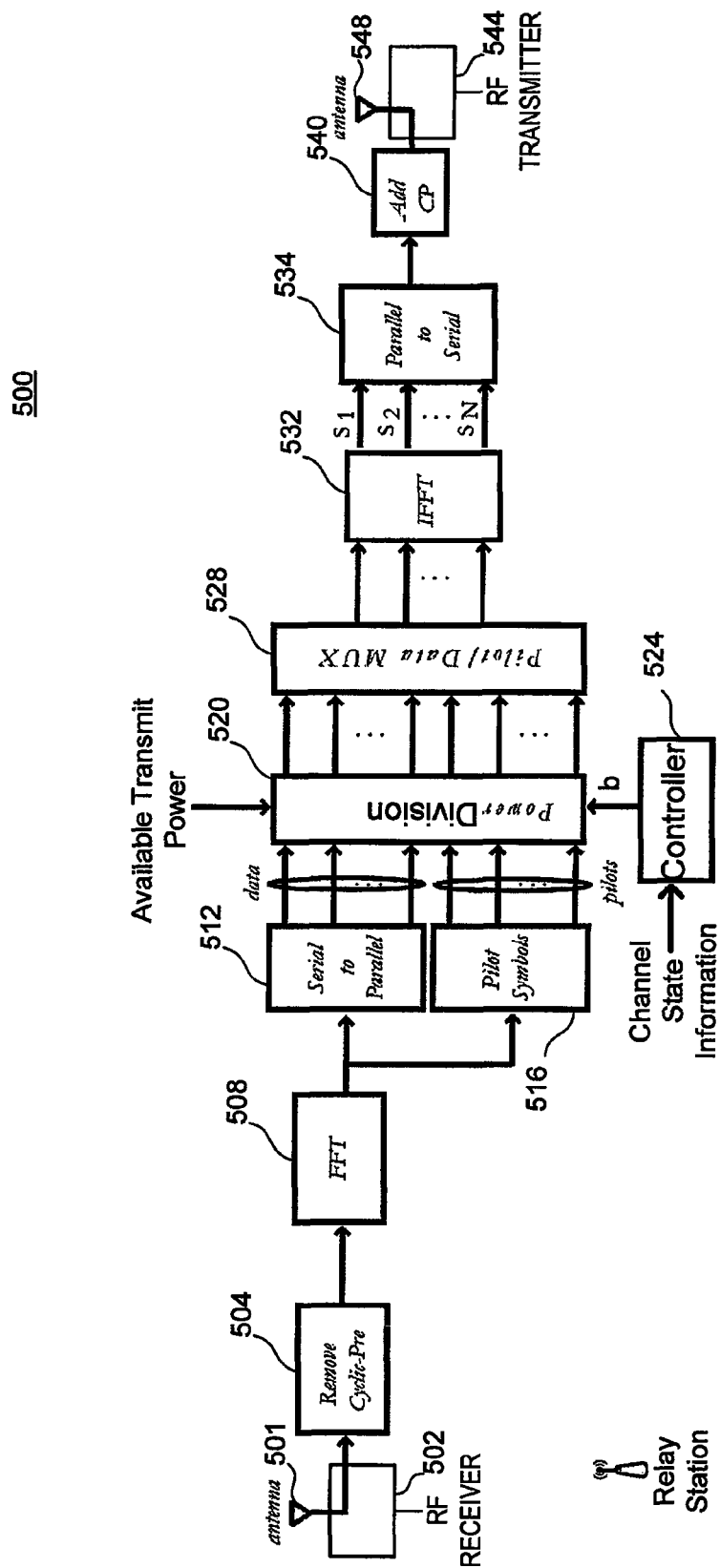
FIG. 5 is a block diagram for a portion of an example transmitter, such as a relay station.

FIG. 5 is a block diagram for a portion of an example transmitter 500, such as a relay station configured in accordance with at least some embodiments described herein. The transmitter 500 is configured to receive the transmission symbols transmitted by a transmitter and retransmit the transmission symbols, for example, to improve the range over which the transmission symbols may be accurately received. The transmitted transmission symbols are received by an RF receiver 502 over an antenna 501. The RF receiver 502 is arranged to demodulate and amplify the transmission symbols and provide the demodulated and amplified transmission symbols to a CP removal block 504. The CP removal block 504 is arranged to receive the demodulated and amplified transmission symbols and remove the cyclical prefixes and provide the remaining transformed symbols to a Fourier transform block 508. The Fourier transform block 508, serial-to-parallel converter 512, and pilot symbol extraction block 516 are arranged to extract pilot and data symbols from the received transmission symbols. The extracted pilot and data symbols are provided to a power division block 520. A power division controller 524 is arranged to control the power division block 520 to allocate available transmit power between the pilot symbols and the data symbols for transmission according to a power ratio "b." The transmit power level for the pilot symbols can be adjusted along with the transmit power level for the data symbols to achieve the power ratio "b." Power adjusted data and pilot symbols are provided by the power division block 520 to a multiplexer 528 that is arranged to multiplex the power divided pilot and data symbols and assemble the pilot symbols with the data symbols for transmission. The assembled pilot and data symbols are provided to an inverse discrete Fourier transform (IFFT) block 532. The IFFT block 532 is configured to generate transformed symbols (i.e., S1, S2, . . . SN). The transformed symbols are provided to a parallel-to-serial converter 534 and then to a CP block 540 for addition of a cyclical prefix to provide a transmission symbol. The transmission symbols are provided to a RF transmitter 544 configured to modulate and amplify the transmission symbols to be retransmitted from the transmitter 500 through the antenna 548.

Figure 6:
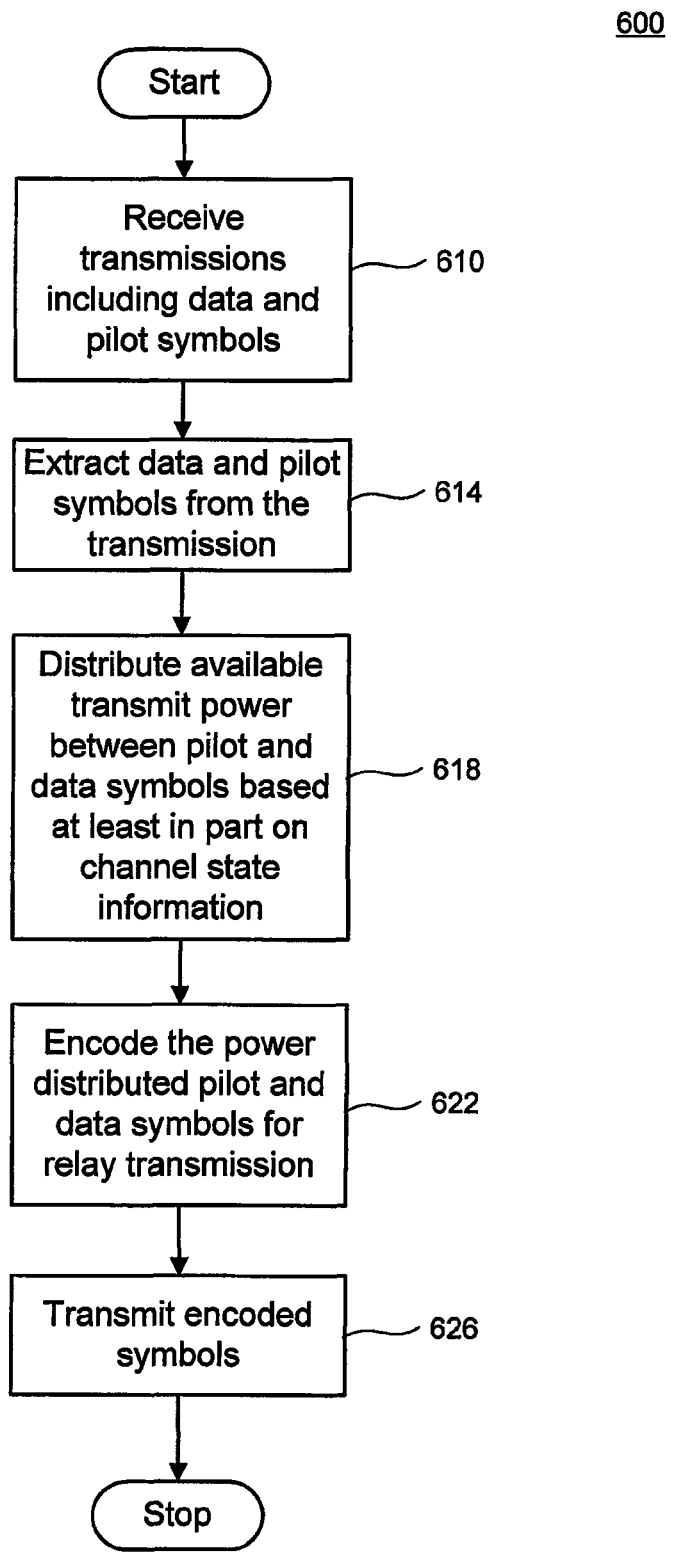
FIG. 6 is a flow diagram illustrating some example methods for retransmitting data; all arranged in accordance with at least some examples of the present disclosure.

FIG. 6 is a flow diagram illustrating some example methods for retransmitting data in accordance with at least some embodiments described herein. The example methods of FIG. 6 may be implemented in the example transmitter 500 of FIG. 5. As example method may include one or more operations, actions, or functions as illustrated by one or more of blocks 610, 614, 618, 622, and/or 626. Although illustrated as discrete blocks, various blocks may be divided into additional blocks, combined into fewer blocks, or eliminated, depending on the desired implementation. Processing may begin at block 610. In block 610 transmissions including pilot and data symbols may be received. Block 610 may be followed by block 614. The pilot and data symbols are extracted in block 614. Block 614 may be followed by block 618. Available transmit power is allocated between the pilot symbols and data symbols based at least in part on channel state information in block 618. Block 618 may be followed by block 622. In block 622 the pilot symbols and data symbols are encoded into relay transmissions and the relay transmission may be transmitted in block 626. The pilot symbols may be transmitted at a first power level while the data symbols may be transmitted by a transmitter at a second power level. For this example, the first power ratio corresponds to the ratio of the first power level to the second power level. Processing for method 600 may be terminated after block 626.

Figure 7:
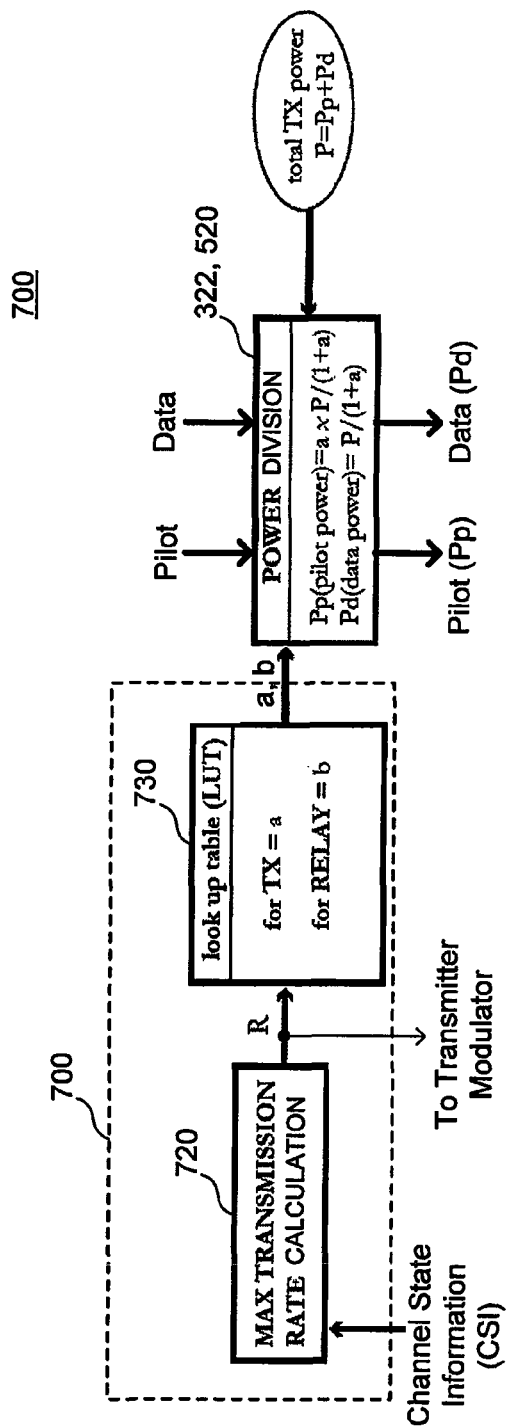
FIG. 7 is a block diagram for an example a power division controller portion.

FIG. 7 is a block diagram for an example power division controller 700. The power division controller 700 includes a maximum transmission rate calculation block 720 that is configured to receive channel state information (CSI) in accordance with at least some embodiments described herein. A look-up table (LUT) 730 is coupled to the maximum transmission rate calculation block 720, and configured to receive the calculated maximum transmission rate therefrom. Control information is provided by the power division controller 700 to a power division block, such as power division blocks 322 and 520 of the transmitters 300 and 500, respectively. The control information from the power division controller 700, as previously discussed, is utilized by the power division block to adaptively divide the available transmit power between the pilot symbols and data symbols. In operation, the maximum transmission rate calculation block 720 is configured to determine from the CSI an approximately maximum transmission rate. The maximum transmission rate is provided to the LUT 730 and to the modulator of the transmitter. The LUT 730 includes stored therein, power ratios (e.g., "a" applied by a base station, "b" applied by a relay station) associated with different transmission rates. The associated power ratios are selected by the LUT 730 based on the determined maximum transmission rate from the calculation block 720. The power division block (e.g., 322 or 520) is configured to divide the available transmit power between the pilot symbols and the data symbols based on the selected power ratios. For example, when the total available transmit power is given as "P" and the ratio of the transmit power for the base station is given as "a", the pilot power "$P_P$" and the data power "$P_D$" can be determined by the equations $P_P = a \cdot P/(1+a)$ and $P_D = P/$ (1+a). Similarly, when the ratio of the transmit power for the relay station is given as "b", the pilot power "$P_P$" and the data power "$P_D$" can be determined by the equations $P_P = b \cdot P/(1+b)$ and $P_D = P/(1+b)$.

Figure 8:
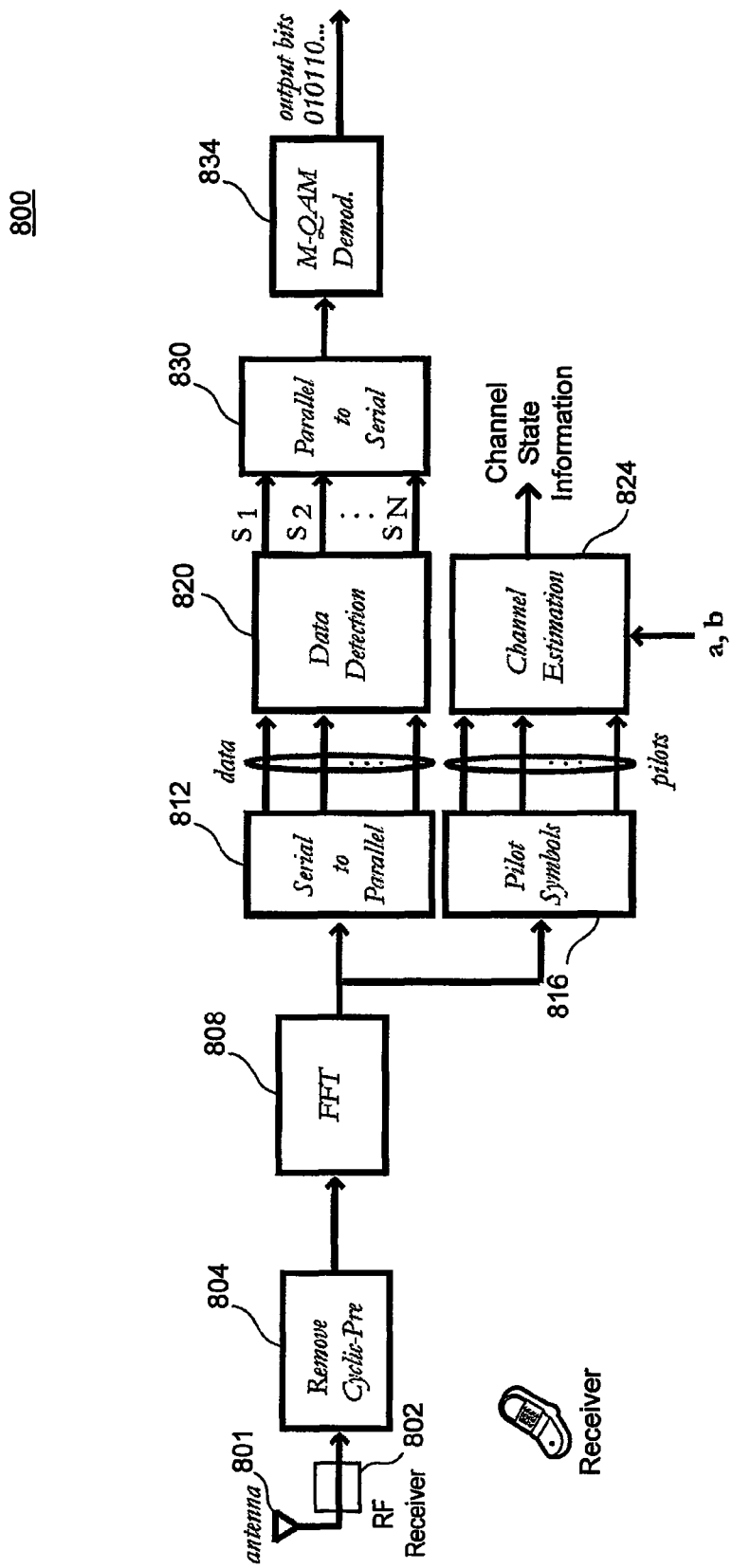
FIG. 8 is a block diagram for a portion of an example receiver.

FIG. 8 is a block diagram for a portion of an example receiver 800 configured in accordance with at least some embodiments described herein. The receiver 800 is configured to receive transmission symbols transmitted by a transmitter and extract data from the received transmission. The received transmission is received by an RF receiver 802 over an antenna 801. The RF receiver 802 is arranged to demodulate and amplify the received transmission symbols and provide the demodulated and amplified transmission symbols to a CP removal block 804. The CP removal block 804 is arranged to receive transmission symbols and remove the cyclical prefixes and provides the transformed symbols to a Fourier transform block 808. The Fourier transform block 808, serial-to-parallel converter 812, and data detection block 820 are arranged to extract data symbols from the received transmission symbols. The extracted data symbols (i.e., S1, S2, . . . SN) are provided to a multi-quadrature amplitude (M-QAM) demodulator 834 that is arranged to demodulate the data symbols into a stream of data bits that represent data transmitted by a transmitter. In some embodiments, reception and recovery of data according to OFDM may be used. Pilot symbol extraction block 816 is arranged to extract pilot symbols from the received transmission symbols which are provided to channel estimation block 824. The power ratios a, b applied by the transmitters (e.g., base station and relay station) are provided to the channel estimation block 824 which is arranged to use the power ratios a, b along with the pilot symbols to estimate the channel over which the receiver 800 may communicate with a transmitter. Channel state information derived from the channel estimation is provided to the transmitter, such as a base station or relay station.

Figure 9:
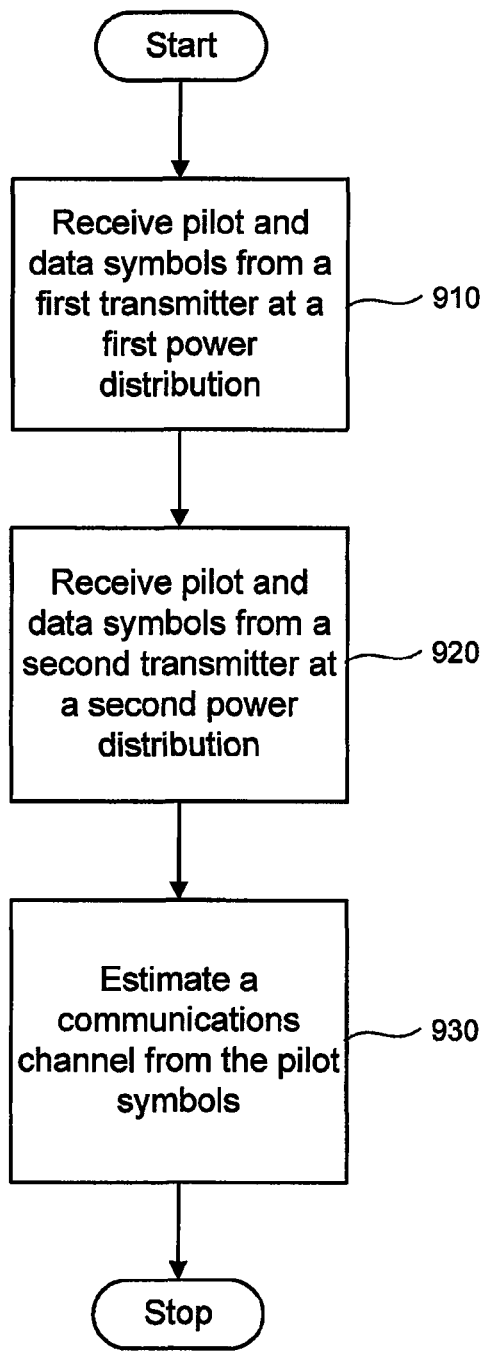
FIG. 9 is a flow diagram illustrating some example methods for establishing a communications channel; all arranged in accordance with at least some examples of the present disclosure.

FIG. 9 is a flow diagram illustrating some example methods for establishing a communications channel in accordance with at least some embodiments described herein. The example methods of FIG. 9 may be implemented in the example receiver 800 of FIG. 8. As example method may include one or more operations, actions, or functions as illustrated by one or more of blocks 910, 920, and/or 930. Although illustrated as discrete blocks, various blocks may be divided into additional blocks, combined into fewer blocks, or eliminated, depending on the desired implementation. Processing may begin at block 910. In block 910 pilot and data symbols transmitted by a first transmitter (e.g., a base station) having a first power ratio are received by a receiver. The pilot symbols may be transmitted at a first power level while the data symbols may be transmitted by a transmitter at a second power level. For this example, the first power ratio corresponds to the ratio of the first power level to the second power level. Block 910 may be followed by block 920. Pilot and data symbols transmitted by a second transmitter (e.g., a relay station) having a second power ratio are received by the receiver in block 920. The pilot symbols may be transmitted at a first power level while the data symbols may be transmitted by a transmitter at a second power level. For this example, the second power ratio corresponds to the ratio of the first power level to the second power level. Block 920 may be followed by block 930. In block 930 the receiver estimates a communications channel from the symbols, for example, the pilot symbols. In a non-limiting example, a communications channel is estimated by the receiver based at least in part from the accuracy of the received pilot symbols as compared with the known pilot symbols. The channel estimation analysis may be implemented using techniques now known or later developed. Processing for method 900 may be terminated after block 930.

The present disclosure is not to be limited in terms of the particular examples described in this application, which are intended as illustrations of various aspects. Many modifications and examples can may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method for a wireless device, the method comprising:
receiving a first transmission signal, wherein the first transmission signal includes data symbols and pilot symbols having a first power ratio encoded therein;
extracting the data and pilot symbols from the transmission signal;
allocating available transmit power between the pilot symbols and the data symbols based at least in part on a channel estimation, wherein the channel estimation is based at least in part on transmissions from the wireless device and the first transmission signal;
encoding the pilot symbols and data symbols having a second power ratio into a second transmission signal using the allocated available transmit power; and
transmitting the second transmission signal as a relay transmission.

2. The method of claim 1 wherein receiving the first transmission signal comprises receiving a transmission signal including data and pilot symbols transmitted at different power levels.

3. The method of claim 2 wherein allocating available transmit power comprises dividing available transmit power between the pilot symbols and data symbols according to the second power ratio different than the first power ratio.

4. The method of claim 1, further comprising receiving the channel estimation from a second wireless device.

5. The method of claim 1 wherein encoding the pilot symbols and data symbols into the second transmission signal comprises modulating the pilot symbols and data symbols according to orthogonal frequency division multiplexing and based at least in part on the channel estimation.

6. The method of claim 1 wherein receiving the first transmission signal comprises receiving the first transmission signal from a base station.

7. The method of claim 1 wherein allocating available transmit power between the pilot symbols and the data symbols comprises allocating a first level of the available transmit power to the pilot symbols and a second level of the available transmit power to the data symbols, wherein the first level of the available transmit power is different from the second level of the available transmit power.

8. The method of claim 1 wherein allocating available transmit power between the pilot symbols and the data symbols further comprises allocating the available power such that the first portion is less than the second portion.

9. A relay transmitter, comprising:
a receiver configured to receive a transmission signal including data symbols and pilot symbols encoded therein;
an symbol extraction block coupled to the receiver and configured to extract data and pilot symbols from the transmission signal;
a power division controller configured to receive channel state information and calculate a respective power at which to transmit the pilot and data symbols based at least in part on the channel state information, the channel state information based at least in part on transmission signals, the transmission signals including data symbols and pilot symbols encoded therein, and the transmission signals from a plurality of transmitters;
a power division block coupled to the power division controller and the extraction block, the power division block configured to divide available transmit power between the pilot symbols and the data symbols according to the respective power ratio and provide power divided data and pilot symbols;
a transmission symbol generation block coupled to the power division block and configured to generate transmission symbols from the power divided data and pilot symbols; and
a transmitter coupled to the transmission symbol generation block and configured to wirelessly transmit the transmission symbols.

10. The relay transmitter of claim 9 wherein the power division controller comprises:
a transmission rate calculation block configured to receive the channel state information and calculate a transmission rate based at least in part on the channel state information; and
a look-up table configured to store at least one power ratio associated with a respective transmission rate and further configured to provide the power ratio associated with the transmission rate calculated by the transmission rate calculation block to the power division block.

11. The relay transmitter of claim 9 wherein the symbol extraction block comprises:
a cyclical prefix removal block configured to remove a cyclical prefix from the transmission signal;
a transformation block configured to transform the transmission signal with the cyclical prefix removed into a transformed transmission signal; and
data and pilot symbol extraction blocks configured to extract the data and pilot symbols from the transformed signal.

12. The relay transmitter of claim 9 wherein the transmission symbol generation block comprises:
a multiplexer configured to multiplex the power divided data and pilot symbols and assemble the pilot symbols with the data symbols for transmission;
a transformation block configured to transform the assembled pilot and data symbols into transformed symbols; and
a cyclical prefix block configured to add a cyclical prefix to the transformed symbols.

* * * * *